US011351475B2

United States Patent
Wallace (10) Patent No.: US 11,351,475 B2
(45) Date of Patent: *Jun. 7, 2022

(54) SYSTEM AND METHOD FOR REMOVAL OF SCALE FORMING COMPONENTS

(71) Applicant: Enviro Water Minerals Company, Inc., Houston, TX (US)

(72) Inventor: Paul Steven Wallace, Austin, TX (US)

(73) Assignee: Enviro Water Minerals Company, Inc., Houston, TX (US)

( * ) Notice: Subject to any disclaimer, the term of this patent is extended or adjusted under 35 U.S.C. 154(b) by 106 days.

This patent is subject to a terminal disclaimer.

(21) Appl. No.: 16/819,719

(22) Filed: Mar. 16, 2020

(65) Prior Publication Data

US 2020/0215454 A1 Jul. 9, 2020

Related U.S. Application Data

(63) Continuation of application No. 15/634,608, filed on Jun. 27, 2017, now Pat. No. 10,589,188.

(Continued)

(51) Int. Cl.
*B01D 9/00* (2006.01)
*B01D 61/02* (2006.01)
(Continued)

(52) U.S. Cl.
CPC .............. *B01D 9/0036* (2013.01); *B03D 3/00* (2013.01); *C02F 5/02* (2013.01); *C02F 9/00* (2013.01);
(Continued)

(58) Field of Classification Search
CPC .............. B01D 9/0036; B01D 2311/04; B01D 2311/06; B01D 2311/08; B01D 2311/12;
(Continued)

(56) References Cited

U.S. PATENT DOCUMENTS 5,156,746 A 10/1992 Maree
5,246,677 A 9/1993 Moser et al.
(Continued)

FOREIGN PATENT DOCUMENTS

WO 2009152148 12/2009
WO 2012170406 12/2012
(Continued)

OTHER PUBLICATIONS

MI Systems boasts $100 million valuation; Americas; Feb. 2019; p. 25; Growth Capital.
(Continued)

*Primary Examiner* — John Kim
(74) *Attorney, Agent, or Firm* — Fletcher Yoder, PC (57) ABSTRACT

A method includes supplying a supersaturated brine stream having a plurality of minerals and anti-scalant from a water treatment system to a gypsum removal system disposed within a mineral removal system. The gypsum removal system includes a gypsum reactor that may receive the supersaturated brine, may deactivate the anti-scalant such that gypsum precipitates from the supersaturated brine, and may generate a gypsum slurry having a mixture of desupersaturated brine, precipitated gypsum, and the anti-scalant in solution with the desupersaturated brine. The method also includes supplying gypsum seed crystals to the gypsum reactor. The gypsum seed crystals may precipitate the gypsum from the supersaturated brine to generate the gypsum slurry. The method also includes directing a first portion of the gypsum slurry from the gypsum reactor to a gypsum settler. The gypsum settler may reactivate the anti-scalant such that the anti-scalant absorbs onto the precipitated gypsum to remove the anti-scalant from the desupersaturated brine and may generate anti-scalant-gypsum crystals and a desupersaturated overflow having at least a portion of (Continued)

the plurality of minerals. The method further includes generating the gypsum seed crystals supplied to the gypsum reactor using the anti-scalant-gypsum crystals.

13 Claims, 4 Drawing Sheets

Related U.S. Application Data (60) Provisional application No. 62/355,055, filed on Jun. 27, 2016.

(51) Int. Cl.
*C02F 5/02* (2006.01)
*C02F 9/00* (2006.01)
*C02F 1/66* (2006.01)
*C02F 1/00* (2006.01)
*C02F 1/52* (2006.01)
*C02F 1/44* (2006.01)
*B03D 3/00* (2006.01)
*C02F 101/10* (2006.01)
*B01D 61/58* (2006.01)

(52) U.S. Cl.
CPC ............ *B01D 61/027* (2013.01); *B01D 61/58* (2013.01); *B01D 2009/0086* (2013.01); *B01D 2311/04* (2013.01); *B01D 2311/06* (2013.01); *B01D 2311/08* (2013.01); *B01D 2311/12* (2013.01); *B01D 2311/18* (2013.01); *B01D 2311/2642* (2013.01); *C02F 1/004* (2013.01); *C02F 1/442* (2013.01); *C02F 1/66* (2013.01); *C02F 2001/007* (2013.01); *C02F 2001/5218* (2013.01); *C02F 2101/101* (2013.01)

(58) Field of Classification Search
CPC ........ B01D 2311/18; B01D 2311/2642; B01D 61/027; B01D 61/58; B01D 2009/0086; B03D 3/00; C02F 1/004; C02F 1/442; C02F 1/66; C02F 5/02; C02F 9/00; C02F 2101/101; C02F 2001/007; C02F 2001/5218
See application file for complete search history.

(56) References Cited

U.S. PATENT DOCUMENTS

| | | | |
|---|---|---|---|
| 5,520,816 A | 5/1996 | Kuepper | |
| 6,508,936 B1 | 1/2003 | Hassan | |
| 7,459,088 B2 | 12/2008 | Davis | |
| 7,595,001 B2 | 9/2009 | Arakel et al. | |
| 8,647,509 B2 | 2/2014 | Vora et al. | |
| 8,999,171 B2 | 4/2015 | Wallace | |
| 10,280,095 B1 | 5/2019 | Garudachari et al. | |
| 10,940,439 B1 | 3/2021 | Ahmed et al. | |
| 2004/0055955 A1 | 3/2004 | Davis | |
| 2008/0012585 A1 | 1/2008 | Chung et al. | |
| 2010/0163471 A1 | 7/2010 | Elyanow et al. | |
| 2012/0160753 A1 | 6/2012 | Vora et al. | |
| 2014/0044485 A1 | 2/2014 | Wallace | |
| 2015/0203379 A1 | 7/2015 | Eda et al. | |
| 2015/0352498 A1 | 12/2015 | Raman | |
| 2020/0308037 A1 | 10/2020 | Alamoudi et al. | |

FOREIGN PATENT DOCUMENTS

| | | |
|---|---|---|
| WO | 2013033841 | 3/2013 |
| WO | 2013091129 | 6/2013 |
| WO | 2015077727 | 5/2015 |
| WO | 2018208305 A1 | 11/2018 |

OTHER PUBLICATIONS

Cohen, Yoram, Reverse Osmosis Field Study (Final Report), Jun. 16, 2010, DWR-WRCD Agreement 46000534-03 Task Order No. 22, Los Angeles, California.

Cohen, Yoram, Self-Adaptive High Recovery Desalination of Agricultural Drainage Water With Concentrate Salt Harvesting, Grant Application Packet, Jan. 1, 2015, Los Angeles, California.

Hussain, A.A., Recent Patents of Nanofiltration Applications in Oil Processing, Desalination, Wastewater and , Food Industries, Jan. 1, 2009.

Colburn, Andrew S. et al, High Total Dissolved Solids Water Treatment by Charged Nanofiltration Membranes Relating to Power Plant Applications, I&EC Research Industrial & Engineering Chemistry Research, Mar. 21, 2016.

Weijnen, MPC et al., Adsorption ofPhosphonat.es on Gypsum Crystals, Journal of Crystal Growth 79, pp. 157-168, 1986, North-Holland Amsterdam.

SYSTEM AND METHOD FOR REMOVAL OF SCALE FORMING COMPONENTS

CROSS REFERENCE TO RELATED APPLICATION

This application is a continuation of U.S. Non-Provisional patent application Ser. No. 15/634,608, entitled "System and Method for Removal of Scale Forming Components," filed Jun. 27, 2017, issued as U.S. Pat. No. 10,589,188, which claims benefit from the priority of U.S. Provisional Patent Application No. 62/355,055, entitled "System and Method for Removal of Scale Forming Components," filed Jun. 27, 2016, which is hereby incorporated by reference in its entirety.

BACKGROUND

The subject matter disclosed herein relates generally to mineral extraction, and more particularly, to a system and method for removal of scale forming components.

There are several regions in the United States (e.g., the southwestern United States including New Mexico, Southern California, and parts of Texas) and throughout the world that experience shortages in potable water supplies due, in part, to the arid climate of these geographic locales. As water supplies are limited, there is a need for innovative technologies and alternative water supplies for both drinking water and agriculture. One method for obtaining an alternative source of potable water uses desalination systems to produce the potable water.

The desalination process involves the removal of salts from seawater, agricultural run-off water, and/or brackish ground water brines to produce potable water. Desalination may use an assortment of filtration methods, such as nanofiltration and reverse osmosis, to separate raw water stream into a desalinated water stream and a tailing stream. The tailing streams may contain various salts and other materials left over after the desalination process. Thus, alternative and innovative uses of the tailing streams may reduce undesirable results of disposing the tailing streams.

One such alternative use involves processing the tailing stream to remove valuable minerals. In particular, inland brackish water and seawater may be rich in sulfates, magnesium, calcium, and other minerals. Sulfates, mainly in the form of gypsum, have a variety of commercial uses, including, but not limited to building materials (e.g., drywall or sheetrock), skin creams, shampoos, and dental impression plasters. In addition, gypsum may be used as a fertilizer and/or soil conditioner in the farming industry. Magnesium may also be extracted in the form of magnesia (e.g., magnesium oxide) which is used in the refractory industry due to its fireproofing capabilities as well as in the medical field as an ingredient in laxatives. As the traditional deposits for these minerals are depleted, the capacity to extract them from alternative sources represents both a valuable commercial opportunity as well as a means for lessening the environmental impact caused by the disposal of waste streams high in salt content.

Existing procedures for the removal of minerals often exhibit sub-optimal efficiency. For example, evaporation pools require a large area of land and often produce low purity mixed salts with minimal commercial value. In addition, a waste mixed salt solid resulting from the evaporation process may leach into the ground water supply. Other methods of extraction involve processing the tailing stream produced in brackish water or seawater desalination plants. However, current mineral extraction procedures for the tailing stream may not operate efficiently.

As described above, desalination systems may employ one or a combination of nanofiltration and reverse osmosis to facilitate the desalination and removal process. Following an initial separation of a potable water stream from a tailing stream, the tailing stream may be processed further by a mineral removal system. For example, various precipitation techniques may be performed that facilitate removal of dissolved minerals from a solution. However, the high salt concentration in the tailing stream may increase the solubility of many of these valuable minerals and, as a consequence, decrease the efficiency of precipitation of these minerals. Inadequate removal of these minerals may have a negative impact on the mineral removal system itself. For example, incomplete gypsum removal may result in scaling of filtration and/or reverse osmosis membranes, thereby reducing extraction efficiency and/or increasing costs associated with mineral removal.

BRIEF DESCRIPTION

In a first embodiment, a method includes supplying a supersaturated brine stream having a plurality of minerals and anti-scalant from a water treatment system to a gypsum removal system disposed within a mineral removal system. The gypsum removal system includes a gypsum reactor that may receive the supersaturated brine, may deactivate the anti-scalant such that gypsum precipitates from the supersaturated brine, and may generate a gypsum slurry having a mixture of desupersaturated brine, precipitated gypsum, and the anti-scalant in solution with the desupersaturated brine. The method also includes supplying gypsum seed crystals to the gypsum reactor. The gypsum seed crystals may precipitate the gypsum from the supersaturated brine to generate the gypsum slurry. The method also includes directing a first portion of the gypsum slurry from the gypsum reactor to a gypsum settler. The gypsum settler may reactivate the anti-scalant such that the anti-scalant absorbs onto the precipitated gypsum to remove the anti-scalant from the desupersaturated brine and may generate anti-scalant-gypsum crystals and a desupersaturated overflow having at least a portion of the plurality of minerals. The method further includes generating the gypsum seed crystals supplied to the gypsum reactor using the anti-scalant-gypsum crystals.

In a second embodiment, a system includes a mineral removal system having a gypsum removal system fluidly coupled to a water treatment system and may receive a supersaturated brine stream having a plurality of minerals and an anti-scalant from the water treatment system. The plurality of minerals include gypsum. The gypsum removal system includes a gypsum reactor that may receive the supersaturated brine stream, may deactivate the anti-scalant such that gypsum precipitates from the supersaturated brine, and may generate a gypsum slurry having a mixture of a desupersaturated brine, precipitated gypsum, and the anti-scalant in solution with the desupersaturated brine. The gypsum removal system also includes a gypsum settler disposed downstream from and fluidly coupled to the gypsum reactor. The gypsum settler may receive a first portion of the gypsum slurry from the gypsum reactor, may reactivate the anti-scalant such that the anti-scalant absorbs onto the precipitated gypsum to remove the anti-scalant from the desupersaturated brine, and may generate anti-scalant-gypsum crystals and a desupersaturated overflow comprising at least a portion of the plurality of minerals. The gypsum removal system also includes an attrition device disposed downstream from and fluidly coupled to the gypsum settler, and disposed upstream of and fluidly coupled to the gypsum reactor. The attrition device may receive the anti-scalant-gypsum crystals from the gypsum settler, may generate gypsum seed crystals from the anti-scalant-gypsum crystals, and may direct the gypsum seed crystals to the gypsum reactor via a flow path extending between the attrition device and the gypsum reactor. The gypsum seed crystals may precipitate the gypsum from the supersaturated brine to generate the gypsum slurry.

In a third embodiment, a system includes a gypsum removal system that may be fluidly coupled to a water treatment system that may generate a supersaturated brine stream having a plurality of minerals and an anti-scalant. The gypsum removal system includes a gypsum reactor that may receive the supersaturated brine stream from the water processing system, may deactivate the anti-scalant such that at least a portion of the plurality of minerals precipitates from the supersaturated brine stream, and may generate a slurry having a mixture of a desupersaturated brine and the precipitated portion of the plurality of minerals. The precipitated portion of the plurality of minerals includes gypsum. The gypsum removal system also includes a gypsum settler disposed downstream from and fluidly coupled to the gypsum reactor. The gypsum settler may receive a first portion of the slurry from the gypsum reactor, may reactivate the anti-scalant such that the anti-scalant absorbs onto the gypsum to remove the anti-scalant from the desupersaturated brine, and may generate anti-scalant-gypsum crystals and a desupersaturated overflow. The gypsum removal system also includes an attrition device disposed downstream from and fluidly coupled to the gypsum settler, and disposed upstream of and fluidly coupled to the gypsum reactor. The attrition device may receive the anti-scalant-gypsum crystals from the gypsum settler, may generate gypsum seed crystals from the anti-scalant-gypsum crystals, and may direct the gypsum seed crystals to the gypsum reactor via a flow path extending between the attrition device and the gypsum reactor. The gypsum seed crystals may precipitate the gypsum from the supersaturated brine stream to generate the slurry.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a water processing system (e.g., desalination system) configured to desalinate water (e.g., seawater, agricultural run-off water, brackish ground water, or a combination thereof) and to recover minerals extracted from the desalinated water. In water desalination processes, ion separation systems are used to extract minerals (e.g., calcium, magnesium, sodium, and sulfate) from tailing streams (e.g., nanofiltration and/or reverse osmosis non-permeate streams) that may otherwise be discarded. The extracted minerals may be recovered as industrial grade products for commercial use. During desalination of the water and mineral recovery, the minerals may cause scaling of system components (e.g., nanofiltration (NF) system(s), electrodialysis system(s), reverse osmosis system(s), etc.) used for desalination of the water. Scaling may increase the operational costs of the system due, in part, maintenance for removal of scale and/or replacement of scaled components. Therefore, it may be advantageous to solubilize and/or remove the scale forming compounds to mitigate scaling of system components.

For example, an anti-scalant may be added to one or more fluid streams throughout the water processing system to mitigate scale formation on the system components. The anti-scalant may allow short term supersaturation of scaling components (e.g., calcium carbonate, gypsum, silica) in the fluid streams (e.g., water stream) generated in the water processing system, resulting in a supersaturated fluid. The supersaturated fluid may have a saturation index (e.g., solubility product/saturation solubility product) of approximately 800 percent (%). The scaling components in the supersaturated fluid may be recovered via crystallization and settling techniques that desupersaturate the supersaturated fluid stream and generate a desupersaturated fluid stream. The desupersaturated fluid stream may be directed to membrane systems within the water processing system and may undergo further desalination. Additionally, the recovered scaling components removed from the supersaturated fluid stream may be further processed to generate a commercially viable product (e.g., gypsum and/or magnesium hydroxide ($Mg(OH)_2$). However, the anti-scalant used to mitigate scaling of the system components may interfere with desupersaturation of the supersaturated fluid by blocking crystallization of the scaling components dissolved in the supersaturated fluid. Accordingly, present embodiments include a water processing system that deactivates the anti-scalant and uses seed crystals to facilitate precipitation of minerals in the supersaturated brine stream and generate a desupersaturated brine stream.

Certain techniques used to mitigate incomplete desupersaturation may add acid (e.g., hydrochloric acid (HCl) to adjust a pH of the supersaturated fluid stream. For example, a pH of the supersaturated fluid may be adjusted to an acidic pH (e.g., less than approximately 6). The acidic pH may deactivate the anti-scalant and decrease a solubility of the scaling components in the supersaturated fluid stream. As such, a portion of the scaling components may precipitate, thereby desupersaturating the supersaturated fluid stream. Following desupersaturation, a pH of the desupersaturated fluid stream may be adjusted to reactivate the anti-scalant remaining in the desupersaturated fluid stream. For example, the pH of the desupersaturated fluid may be adjusted to an alkaline pH (e.g., above approximately 8). The alkaline pH reactivates the anti-scalant and facilitates a chemical interaction between the anti-scalant and the scaling components. In these techniques, the desupersaturated fluid having the reactivated anti-scalant is combined with a feed stream within the water processing system (e.g., seawater, agricultural run-off water, brackish ground water, or a combination thereof). Therefore, the anti-scalant is recycled back through the water processing system. However, the anti-scalant may breakdown due to repetitive recycling, and result in undesirable anti-scalant byproducts (e.g., low molecular weight organic compounds) within the desalinated water stream. Additionally, the decrease in the pH of the supersaturated fluid may limit removal of silica from the desupersaturated fluid stream, which may result in silica scaling of membrane systems and/or other system components of the water processing system. The alkaline pH may also limit recovery of magnesium used to produce chlor alkali products from the desupersaturated fluid stream. Other techniques use a series of mixers and settlers to desaturate the supersaturated fluid. However, these techniques generate unmarketable calcium carbonate sludge, and do not remove silica, magnesium, and other materials of interest from the desaturated fluid. Accordingly, present embodiments include a water processing system that facilitates removal of silica and anti-scalant from the desupersaturated brine stream and recovery of commercially viable gypsum and magnesium products.

The water processing system disclosed herein may include ion separation systems that extract the minerals (e.g., calcium, magnesium, sodium, and sulfate) from tailing streams generated in the water processing system. The extracted minerals may be recovered (e.g., as gypsum and magnesium hydroxide ($Mg(OH)_2$)) as industrial grade products for commercial use. For example, a pH of the tailing streams may be adjusted such that the extracted minerals in the tailing streams precipitate out of solution to generate a mineral slurry (e.g., gypsum slurry and/or $Mg(OH)_2$ slurry). The water processing system may include certain components such as, but not limited to, settlers, filters, and other suitable system components that facilitate recovery of gypsum and $Mg(OH)_2$ in the respective mineral slurries. The recovered gypsum and $Mg(OH)_2$ may be available for commercial use.

Figure 1:
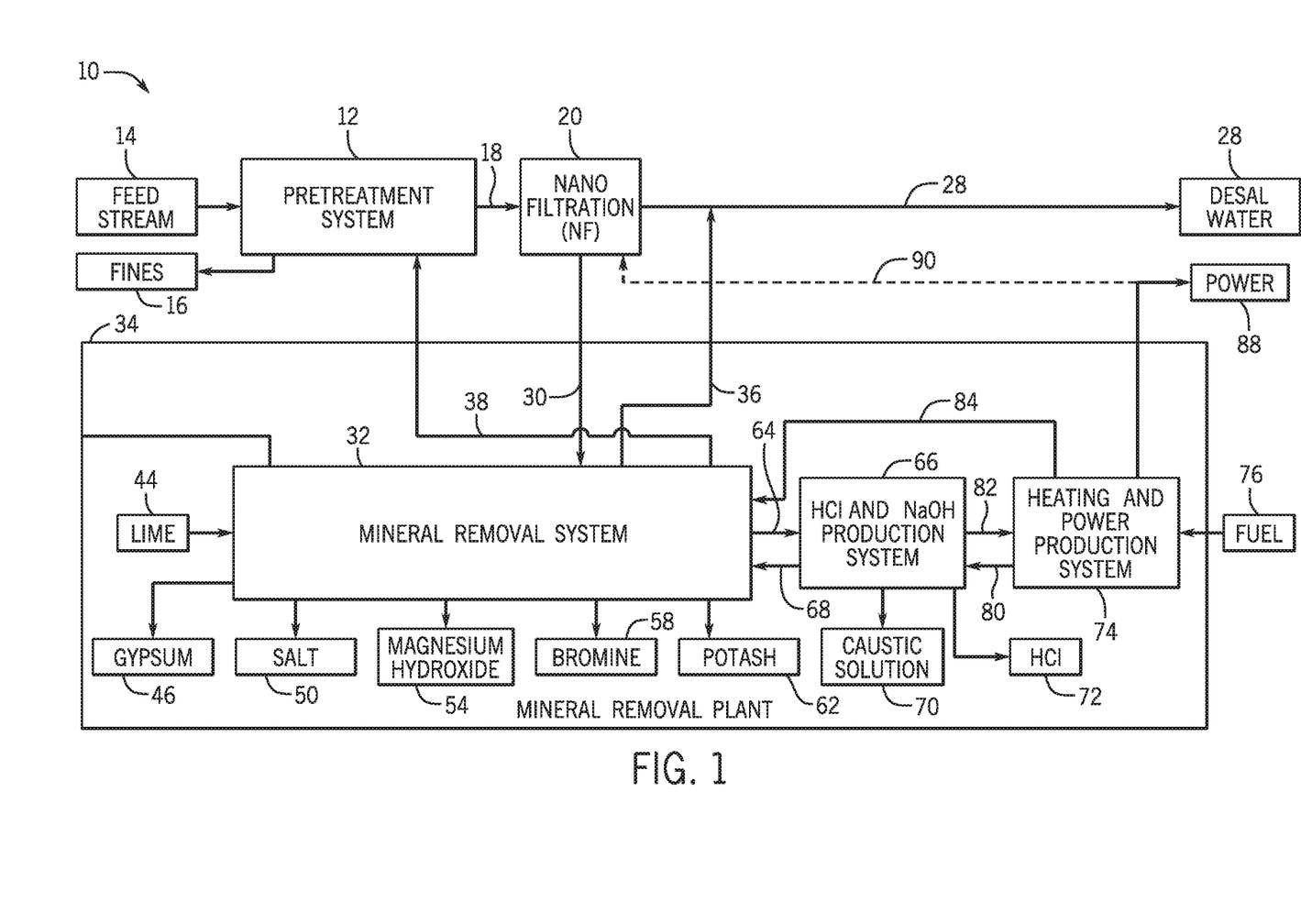
FIG. 1 is a block diagram of an embodiment of a water processing system, in which the water processing system includes a water removal plant having a mineral removal system and a hydrochloric acid (HCl) and sodium hydroxide (NaOH) production system, in accordance with aspects of the present disclosure.

FIG. 1 is a block diagram of an embodiment of a water processing system 10 that may use chemical additives to mitigate scaling of system components used during desalination of water. For example, the water processing system 10 may be part of a water desalination system, wastewater treatment system, water purification system, oil and gas brine treating system or any other suitable water processing system. In the illustrated embodiment, the water processing system 10 is used to produce desalinated water from a feed stream and to remove minerals from the feed stream. For example, the water processing system 10 may be used to produce high purity agricultural grade gypsum ($CaSO.2H_2O$) (e.g., approximately greater than 97 weight percent (wt %) gypsum on a dry basis), industrial grade caustic (e.g., approximately greater than 97 wt % sodium hydroxide (NaOH) on a dry basis), industrial grade magnesium hydroxide ($Mg(OH)_2$) (e.g., approximately greater than 98 wt % $Mg(OH)_2$ on an ignited basis, or on an ignited oxide basis) suitable for industrial magnesia refractory, industrial grade sodium chloride (NaCl) (e.g., approximately greater than 99.9 wt % NaCl on a dry basis), concentrated HCl for commercial use (e.g., approximately 10 wt % to 22 wt %), desalinated water (e.g., approximately less than 1 gram/Liter (g/L) (1000 parts per million (ppm)) total dissolved solids (TDS)), or a combination thereof, from underground brines, seawater desalination waste brines, brackish water desalination waste brines, or a combination thereof. Furthermore, the water processing system 10 may use a combination of one or more of gypsum precipitation, magnesium hydroxide precipitation, electrodialysis (ED), and softening and nanofiltration (NF) to remove the minerals from brines as industrial grade products and/or to substantially reduce (or eliminate) a waste brine stream.

In the illustrated embodiment, the water processing system 10 includes a pretreatment system 12 configured to receive a feed stream 14. The feed stream 14 may be received from any suitable water source. For example, the feed stream 14 may be received from ground water, seawater, brackish water, and so forth. Moreover, the feed stream 14 may contain various elements and/or compounds. For example, the feed stream 14 may contain NaCl, sulfate ($SO_4$), calcium (Ca), magnesium (Mg), and/or silicon dioxide (silica or $SiO_2$), or a combination thereof. In certain embodiments, the feed stream 14 may contain approximately 0.50 g/L (500 ppm) to approximately 3.00 g/L (3,000 ppm) NaCl, approximately 0.10 g/L (100 ppm) to approximately 1.50 g/L (1,500 ppm) $SO_4$, approximately 0.01 g/L (10 ppm) to approximately 0.80 g/L (800 ppm) Ca and Mg, and/or approximately 0.01 g/L (10 ppm) to approximately 0.30 g/L (300 ppm) $SiO_2$, or a combination thereof. Furthermore, in certain embodiments, the feed stream 14 may have a pH range between approximately 5 and 9. For example, the feed stream 14 may have a pH of approximately 8.

The pretreatment system 12 receives the feed stream 14 and removes solid materials (e.g., fines 16), such as iron (Fe) and manganese (Mn), from the feed stream 14. The pretreatment system 12 provides a pretreated feed stream 18 to a first nanofiltration (NF) system 20. The first NF system 20 receives the pretreated feed stream 18 and produces a desalinated water stream 28. In certain embodiments, the desalinated water stream 28 may include $SiO_2$. Moreover, the desalinated water stream 28 may have a pH of approximately 7.5. Furthermore, the first NF system 20 provides a brine stream 30 to a mineral removal system 32. In certain embodiments, the desalinated water stream 28 may be approximately 70 percent to approximately 90 percent of the output from the first NF system 20, and the brine stream 30 may be approximately 10 percent to approximately 30 percent of the output from the first NF system 20. For example, in some embodiments, the desalinated water stream 28 may be approximately 80 percent of the output from the first NF system 20, and the brine stream 30 may be approximately 20 percent of the output from the first NF system 20. As may be appreciated, while the illustrated embodiment uses the first NF system 20, other embodiments may use a reverse osmosis (RO) system in place of the first NF system 20.

The mineral removal system 32 may be part of a mineral removal plant 34. The mineral removal plant 34 is configured to remove minerals, elements, compounds, or combinations thereof, from the brine stream 30. The brine stream 30 may be provided to the mineral removal plant 34 from any suitable source and/or system. In certain embodiments, the brine stream 30 may include substantial amounts of salts, such as NaCl, sodium sulfate ($Na_2SO_4$), calcium (Ca), magnesium (Mg), or combinations thereof. As discussed above, treating the brine stream 30 (e.g., chemically or mechanically) may mitigate scaling (precipitation) of the salts. That is, the brine stream 30 may be treated with chemical additives that increase a solubility of the scaling components in the brine stream 30 and/or soften the brine stream 30 to decrease hardness and divalent compounds, as discussed in further detail below. The mineral removal system 32 may output one or more desalination streams 36 that include desalinated water, which may contain $SiO_2$. Furthermore, the one or more desalination streams 36 may include a disinfectant and/or oxidant. The disinfectant and/or oxidant may be provided to the pretreatment system 12 via a disinfectant stream 38.

A lime based material 40 (e.g., lime, quick lime, dolomitic lime, etc.) may be provided to the mineral removal system 32 to facilitate mineral removal from the brine stream 30. During operation, the mineral removal system 32 may be configured to remove any suitable minerals, elements, compounds, or a combination thereof, from the brine stream 30. For example, the mineral removal system 32 may provide a gypsum stream 46 (e.g., agricultural grade gypsum), a salt stream 50 (e.g., industrial grade sodium chloride), a magnesium hydroxide stream 54 (e.g., industrial grade magnesium hydroxide), a bromine stream 58, a potash stream 62, or a combination thereof, and/or other mineral streams depending on the mineral content of the brine stream 30.

The mineral removal system 32 may generate additional streams that may be collected for commercial use and/or utilized in a downstream process of the water processing system 10. In certain embodiments, the mineral removal system 32 may provide one or more output streams 64 to an HCl and NaOH production system 66. For example, the mineral removal system 32 may provide NaCl brine to the HCl and NaOH production system 66. The HCl and NaOH production system 66 may generate concentrated HCl via an ion separation process (e.g., ED process) followed by an evaporation process. Furthermore, the mineral removal system 32 may receive one or more input streams 68 from the HCl and NaOH production system 66. The one or more input streams 68 may provide the mineral removal system 32 with HCl and/or caustic (e.g., NaOH) produced by the HCl and NaOH production system 66. In addition, the HCl and NaOH production system 66 may generate a caustic solution 70 (e.g., concentrated industrial grade NaOH) and/or a concentrated industrial grade HCl product solution 72 that is not used by the mineral removal system 32 (e.g., produced to be sold).

The mineral removal plant 34 also includes a heating and power production system 74. The heating and power production system 74 may include a natural gas engine and/or a boiler. The heating and power production system 74 may be configured to receive a fuel 76. The fuel 76 may be any suitable fuel, such as natural gas, synthetic natural gas (e.g., syngas), or combination thereof. The heating and power production system 74 may provide power, steam, hot water, any suitable heated fluid, and so forth to the HCl and NaOH production system 66, as indicated by arrow 80. Moreover, the heating and power production system 74 may receive a cooled fluid stream 82 (e.g., cooled water) from the HCl and NaOH production system 66. As illustrated, the heating and power production system 74 may also provide power to the mineral removal system 32, as indicated by arrow 84. Additionally, the heating and power production system 74 may provide power 88 to another system and/or the first NF system 20, as indicated by arrow 90.

Figure 2:
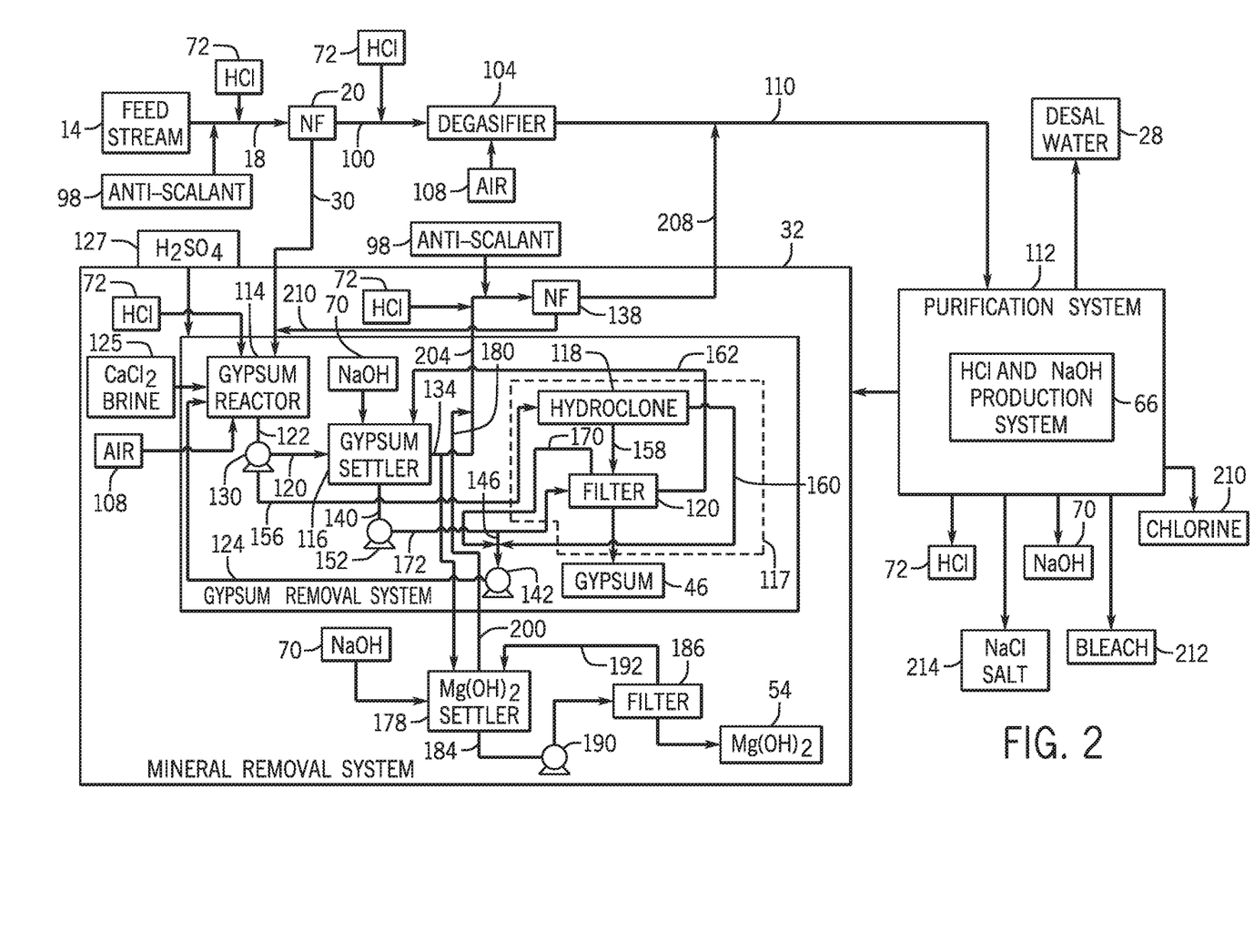
FIG. 2 is a block diagram of an embodiment of the mineral removal plant that may be used in the water processing plant of FIG. 1, in which the mineral removal plant includes a gypsum removal system having a gypsum reactor, a gypsum settler, and a gypsum recovery section.

FIG. 2 is a block diagram of an embodiment of the water processing system 10 having a gypsum removal system configured to remove anti-scalant and facilitate efficient desupersaturation of the brine stream 30. As discussed above, the feed stream 14 may be treated in the pretreatment system before feeding to the first NF system 20. For example, in the illustrated embodiment, the feed stream 14 is treated with HCl 72, which may be generated by the HCl and NaOH production system 66, to decrease a pH of the feed stream 14 to an acidic pH (e.g., equal to or less than approximately 6). The HCl 72 may react with bicarbonate ($HCO_3^-$) in the feed stream 14 and generate soluble $CO_2$ gas, thereby removing the bicarbonate (e.g., as $CO_2$ gas) from the feed stream 14. In addition to the HCl 72, the feed stream 14 may be treated with anti-scalant 98. The anti-scalant 98 may reduce scaling of hardness and divalent compounds/elements and other minerals (e.g., $NaSO_4$). Non-limiting examples of the anti-scalant 98 include gypsum barium sulfate anti-scalants, such as HYPERSPERSE MDC706 (available from GE Water and Process Technology), VITEC® 7000 (available from Avista Technologies Inc.) or any other suitable anti-scalant, and combinations thereof.

Following treatment of the feed stream 14, the treated feed stream 18 is fed to the first NF system 20, which separates monovalent ions (e.g., $Na^-$ and $Cl^-$) from divalent ions (e.g., $Ca^{2+}$, $Mg^{2+}$, and $SO_4^{2-}$) to generate a first permeate stream 100 (e.g., sodium chloride (NaCl)) that may be used to generate the desalinated water 28, and the brine stream 30 (e.g., a supersaturated non-permeate stream), respectively. The first NF system 20 may include single stage or multiple stage NF unit(s) to facilitate separation of the monovalent ions and divalent ions in the feed stream 14. For example, in one embodiment, the first NF system 20 may include two, three, four, or more stage NF unit(s). In other embodiments, the first NF system 20 may have a single stage NF unit(s).

In the illustrated embodiment, the permeate stream 100 is treated with the HCl 72 to convert residual $HCO_3^-$ in the permeate stream 100 to $CO_2$. The permeate stream 100 is fed to a degasifier 104 that uses air 108 to strip the $CO_2$ from the permeate stream 100 and generate a first concentrated NaCl brine 110. The first concentrated NaCl brine 110 may be substantially free of scale forming components. In certain embodiments, the first concentrated NaCl brine 110 may have a negligible amount of silica that may not have been removed by the first NF system 20. Following degasification, the first concentrated NaCl brine 110 may be fed to a purification system 112 that removes impurities from the first concentrated NaCl brine 110 and generates the NaOH 70, the HCl 72, and other chemicals that may be used throughout various processes of the water processing system 10. For example, the purification system 112 may include ion exchange systems (e.g., softeners), electrodialysis (ED) systems, and reverse osmosis (RO) systems, among others. The purification system 112 may also include the HCl and NaOH production system 66, which uses electrodialysis bipolar membranes (EDBM) to generate the NaOH 70 and the HCl 72 from the first concentrated NaCl brine 110.

The brine stream 30 generated in the first NF system 20 includes the divalent ions from the feed stream 14. For example, the brine stream 30 includes minerals such as $NaSO_4$, $SiO_2$, calcium, and magnesium that form scale on system components during desalination. The anti-scalant 98 added to the feed stream 14 may increase the saturation index of the scaling components in the brine stream 30 such that the brine stream 30 is supersaturated with the scaling components (e.g., the minerals). These minerals may be recovered in the mineral removal system 32 to generate commercially viable products such as the gypsum 46 and the magnesium hydroxide 54. For example, in the illustrated embodiment, the brine stream 30 is fed to a gypsum removal system 115 disposed within the mineral removal system 32. The gypsum removal system 115 may include one or more components that facilitate removal and recovery of gypsum. For example, the gypsum removal system may include a gypsum reactor 114, a gypsum settler 116, and a gypsum recovery section 117. In the illustrated embodiment, the gypsum recovery section 117 includes a hydroclone 118 and a filter 120 to facilitate recovery of commercial grade gypsum (e.g., the gypsum 46). The gypsum removal system 115 may also include additional components such as mixers and additional filters to facilitate removal of gypsum.

As discussed above, the anti-scalant 98 increases the solubility of the scaling components in the brine stream 30. Accordingly, the brine stream 30 may be supersaturated with the scaling components. Therefore, to facilitate desupersaturation of the brine stream 30, the gypsum reactor 114 may operate at an acidic pH. The acidic pH decreases the reactivity of the anti-scalant 98, and the solubility of the scaling components in the brine stream 30 also decreases. For example, the gypsum reactor 114 may receive the HCl 72 generated in the HCl and NaOH production system 66. The HCl 72 may adjust and maintain the pH of the gypsum reactor 114 between approximately 2 and approximately 6. Due, in part, to removal of the $CO_2$ from the feed stream 14, the pH of the gypsum reactor 114 may increase without the addition of the HCl 72, which may not allow efficient recovery of the minerals. The acidic pH in the gypsum reactor 114 decreases the efficiency of the anti-scalant 98 by blocking a chemical interaction between the anti-scalant 98 and the scaling components, which facilitates precipitation of at least a portion of the scaling components as gypsum. The gypsum reactor 114 may include a tank educator and an air sparger that receives the air 108 to agitate and mix the brine stream 30, the HCl 72, and other fluids within the gypsum reactor 114 to enable precipitation of gypsum in the gypsum reactor 114.

While the brine stream 30 is in the gypsum reactor 114, the Ca and $SO_4$ in the brine stream 30 react to form gypsum, which precipitates out of the brine stream 30 to generate a gypsum slurry 122 having a mixture of desupersaturated fluid and gypsum. In certain embodiments, approximately 50 percent to approximately 70 percent of the $SO_4$ in the brine stream 30 is removed. To facilitate desupersaturation of the brine stream 30, gypsum seed crystals 124 that are free of anti-scalant 98 (e.g., unpoisoned gypsum seed crystals) may be fed to the gypsum reactor 114. The presence of gypsum seed crystals 124 may facilitate gypsum precipitation kinetics, thereby enabling rapid gypsum precipitation in the gypsum reactor 114. For example, feeding the gypsum seed crystals 124 to the reactor 114 may increase a solids concentration in the gypsum reactor 114 to between approximately 5 percent and approximately 50 percent, thereby facilitating precipitation of gypsum and silica, and desupersaturation of the brine stream 30.

Moreover, in certain embodiments, the brine stream 30 in the gypsum reactor 114 may have a residence time of between approximately 1 hour and approximately 3 hours. This residence time, in combination with turbulent mixing of the brine stream 30, the HCl 72, and the gypsum seed crystals 124 in the gypsum reactor 114 and a large scalant-free gypsum crystal content (e.g., greater than approximately 10 wt %), may enable formation of gypsum having an average particle size of 100 microns or more. The large gypsum particles (e.g., greater than 100 microns) may facilitate removal of the gypsum in downstream system components (e.g., the gypsum settler 116 and/or the gypsum recovery section 117).

In certain embodiments, the feed stream 14 may have a molar ratio of $Ca/SO_4$ that is less than 1. As such, the brine stream 30 may have excess $SO_4$ that may not be removed as gypsum in the gypsum reactor 114. Therefore, desupersaturation of the brine stream 30 may be incomplete. Accordingly, the gypsum reactor 114 may receive calcium chloride ($CaCl_2$) brine 125 to enable precipitation of the excess $SO_4$ as gypsum, and allow desupersaturation of the brine stream 30. For example, the $CaCl_2$) brine 125 may increase the molar ratio of $Ca/SO_4$ in the gypsum reactor 114 such that sufficient calcium is available to react with the excess $SO_4$ in the brine stream 30 to generate gypsum. Therefore, desupersaturation of the brine stream 30 may be achieved. The $CaCl_2$ brine 125 may be from any suitable source (e.g., generated on-site or delivered). For example, as discussed in further detail below with reference to FIG. 3, the $CaCl_2$) may be generated from limestone in a limestone feed and $CO_2$ recovery system coupled to the mineral removal system 32.

In other embodiments, the feed stream 14 may have a molar ratio of $Ca/SO_4$ that is greater than 1. Accordingly, the brine stream 30 may have excess calcium. Accordingly, it may be difficult to fully recover the excess calcium in the gypsum reactor 114, and desupersaturation of the brine stream 30 may be incomplete. To mitigate incomplete desupersaturation of the brine stream 30 when the molar ratio of $Ca/SO_4$ is greater than 1, sulfuric acid ($H_2SO_4$) 127, rather than HCl 72, may be added to the gypsum reactor 114. The $H_2SO_4$ 127 is a source of sulfate ($SO_4^{2-}$). The $SO_4^{2-}$, which decreases the molar ratio of $Ca/SO_4$ in the brine stream 30, and the excess calcium in the brine stream 30 may be removed from the brine stream 30 in the form of gypsum. In this way, desupersaturation of the brine stream 30 may be achieved. The $H_2SO_4$ 127 may also maintain the acidic pH in the reactor (e.g., between approximately 2 and approximately 6) to deactivate the anti-scalant 98 in the brine stream 30, and facilitate precipitation of the gypsum.

In one embodiment, the excess calcium in the brine stream 30 may be used to produce calcium chloride brine in a downstream process of the water processing system 10 (e.g., within the purification system 112). For example, an overflow stream from the gypsum settler 116 may be directed to the purification system 112. The purification system 112 may include one or more ion exchange systems that recover the excess calcium and generate a calcium chloride brine. The calcium chloride brine may be recovered as a commercial grade product and made available for consumer use.

The gypsum reactor 114 receives the gypsum seed crystals 124 generated from the gypsum recovered in a gypsum settler 116. The gypsum settler 116 may receive at least a portion of a gypsum slurry 122 generated in the gypsum reactor 114. The gypsum in the gypsum slurry 122 may be recovered in the gypsum settler 116 and used to generate the gypsum seed crystals 124. For example, the gypsum settler 116 may receive a first portion 128 of the gypsum slurry 122 via a first pump 130 (e.g., a low speed pump). In certain embodiments, the first portion 128 may be between approximately 50 percent and approximately 90 percent of a slurry output from the gypsum reactor 114. The gypsum slurry 122 is a mixture of the desupersaturated fluid and between approximately 5 weight percent (wt %) and approximately 40 wt % gypsum. The desupersaturated fluid may also include the deactivated anti-scalant 98. In addition to the first portion 128 of the gypsum slurry 122, the gypsum settler 116 receives NaOH 70, e.g., from the HCl and NaOH production system 66. The NaOH 70 may adjust a pH of the first portion 128 of the gypsum slurry 122 to between approximately 8 and approximately 10. The alkaline pH in the gypsum settler 116 may result in precipitation of silica as magnesium silicate. In addition, the alkaline pH may also result in precipitation of trace amounts of iron as ferric hydroxide (e.g., $Fe(OH)_3$) and iron silicate, thereby enhancing settling of the gypsum 46. Moreover, the alkaline pH in the gypsum settler 116 reactivates the anti-scalant 98 in the desupersaturated fluid. As such, the anti-scalant 98 absorbs onto surfaces of gypsum particles recovered from the first portion 128 of the gypsum slurry 122, thereby generating anti-scalant-gypsum crystals (e.g., poisoned gypsum crystals). Absorption of the anti-scalant 98 by the gypsum is generally irreversible. Therefore, the anti-scalant 98 may be removed, along with the gypsum, from the desupersaturated fluid in the gypsum settler 116. The anti-scalant-gypsum crystals may be recovered in a filter within the gypsum settler 116, and a first desupersaturated overflow 134, enriched with magnesium, may be fed to a second NF system 138 and/or a magnesium settler 142, as discussed in further detail below.

As discussed above, the gypsum seed crystals 124 may be generated from the gypsum recovered in the gypsum settler 116. However, because the anti-scalant-gypsum crystals recovered in the gypsum settler 116 also include the anti-scalant 98, crystal growth sites on particle surfaces are blocked. Therefore, the anti-scalant-gypsum crystals are unsuitable for promoting crystal growth, which facilitates precipitation of the gypsum and desupersaturation of the brine stream 30. In contrast, the gypsum seed crystals 124 fed to the gypsum reactor 114 do not have absorbed anti-scalant 98. Therefore, crystal growth sites on the gypsum seed crystals 124 are unblocked, and gypsum crystal growth in the gypsum reactor 114 may be achieved.

To generate the gypsum seed crystals 124 within the mineral removal system 32, settler bottoms 140 from the gypsum settler 116 having the anti-scalant-gypsum crystals are fed to an attrition device 142 (e.g., a high head/high speed pump) that attrits the anti-scalant-gypsum crystals to reduce a particle size of the gypsum to generate the gypsum seed crystals 124. The attrition device 142 may direct the gypsum seed crystals 124 to the gypsum reactor 114 to facilitate desupersaturation of the brine stream 30. A second pump 152 (e.g., a low speed pump) may be used to facilitate movement of the settler bottoms 140 from the gypsum settler 116 to the attrition device 142, as shown by arrow 146. Decreasing the particle size of the anti-scalant-gypsum crystals removes the absorbed anti-scalant 98 from the surfaces of the anti-scalant-gypsum crystals such that crystal growth sites on the gypsum crystals are not blocked by the anti-scalant 98, thereby generating the gypsum seed crystals 124 fed to the gypsum reactor 114. The gypsum seed crystals 124 facilitate precipitation of the gypsum in the brine stream 30 within the gypsum reactor 114 to desupersaturate the brine stream 30. By using the gypsum recovered in the gypsum settler 116 to generate the gypsum seed crystals 124, costs associated with purchasing gypsum seed crystals may be reduced. In addition, the anti-scalant 98 may be removed from the water processing system 10 by increasing the pH of the first portion 128 of the gypsum slurry 124 in the gypsum settler 116 to facilitate absorption of the anti-scalant 98 by the gypsum, thereby mitigating the undesirable effects associated with recycling anti-scalant throughout the water processing system 10.

In addition to generating the gypsum seed crystals 124, the gypsum removal system 115 also generates commercial grade gypsum 46 for commercial use. For example, in the illustrated embodiment, a second portion 156 of the gypsum slurry 126 generated in the gypsum reactor 114 is fed to the gypsum recovery section 117 via the first pump 130. In certain embodiments, the gypsum recovery section 117 may receive between approximately 10 percent and approximately 50 percent of the gypsum slurry 126 output by the gypsum reactor 114. While in the gypsum recovery section 117, the hydroclone 118 may selectively harvest the gypsum from the second portion 156 of the gypsum slurry 122 based on particle size. For example, the hydroclone 118 may separate coarse gypsum particles from fine gypsum particles to generate a concentrated gypsum slurry 158 having the coarse gypsum particles and a dilute gypsum slurry 160 having the fine gypsum particles. The concentrated gypsum slurry 158 may have between approximately 30 wt % and approximately 60 wt % gypsum, and the dilute gypsum slurry 160 may have between approximately 1 wt % and approximately 5 wt % gypsum. In certain embodiments, the dilute gypsum slurry 160 may be fed to the attrition device 142 to generate the gypsum seed crystals 124. For example, the dilute gypsum slurry 160 (e.g., recycled gypsum stream) may be combined with the settler bottoms 146 and attrited in the attrition device 142.

The concentrated gypsum slurry 158 may be filtered in the filter 120 (e.g., a vacuum drum or a vacuum belt) to generate a gypsum filter cake that may be recovered as commercially viable gypsum 46. In certain embodiments, the gypsum filter cake may include approximately 70 wt % to approximately 100 wt % gypsum 46. For example, the filter cake may include approximately 90 wt % gypsum 46. A filtrate 162 (e.g., desupersaturated fluid) generated in the filter 120 may be recycled to the gypsum settler 116. In certain embodiments, NaOH 70, e.g., from the HCl and NaOH production system 66, may be fed to the filter 120 and mixed with the concentrated gypsum slurry 158. The NaOH 70 may adjust a pH of the concentrated gypsum slurry 158 to between approximately 8 and approximately 10. As discussed above, alkaline pH reactivates the anti-scalant 98. Therefore, the alkaline pH of the concentrated gypsum slurry 158 may reactivate any residual anti-scalant 98 that may be present in the concentrated gypsum slurry 158 such that the anti-scalant 98 may be absorbed into the gypsum. In this way, residual anti-scalant 98 may be recovered, and therefore, may not be recycled with the filtrate 162 to the gypsum settler 116 or other system components and may be removed from the water processing system 10 along with the gypsum 46.

In certain embodiments, excess concentrated gypsum slurry 170 from the filter 120 may be routed to the second pump 142 and used to generate a portion of the gypsum seed crystals 124. Additionally, in embodiments where there is an insufficient flow of the concentrated gypsum slurry 158 from the hydroclone 118 to the filter 120, a portion of the settler bottoms 140 may be routed to the filter 120, as shown by arrow 172, to maintain a desired solids loading for precipitation of the gypsum 46.

As discussed above, the first desupersaturated overflow 134 is enriched with magnesium (e.g., magnesium chloride ($MgCl_2$)), which may be recovered in a magnesium hydroxide ($Mg(OH)_2$) settler 178. For example, a first portion 180 of the first desupersaturated overflow 134 may be fed to the magnesium hydroxide settler 178 to recover the magnesium from the first desupersaturated overflow 134. In certain embodiments, between approximately 20 percent and approximately 8 percent of the first desupersaturated overflow 134 may be directed to the magnesium hydroxide settler 178. In the magnesium hydroxide settler 178, the first portion 180 of the first desupersaturated overflow 134 may be mixed with NaOH 70, e.g., from the HCl and NaOH production system 66, in a section of the magnesium hydroxide settler 178 (e.g., a reaction tank) to adjust a pH of the first portion 180 of the first desupersaturated overflow 134 to between approximately 9 and approximately 11. The NaOH 70 reacts with $MgCl_2$ in the $Mg(OH)_2$ settler 178 to generate the magnesium hydroxide 54. A pH of the magnesium hydroxide settler 178 is maintained at between approximately 10 and approximately 11 such that excess hydroxide ($OH^-$) is reduced. Solids in a $Mg(OH)_2$ settler mixer section of the $Mg(OH)_2$ settler 178 may be maintained at between approximately 4 wt % to approximately 15 wt % to increase a number of crystal growth sites, and thereby increase magnesium hydroxide crystal size and decrease fines in a magnesium effluent brine (e.g., settler overflow).

A magnesium hydroxide slurry generated in the $Mg(OH)_2$ settler 178 may have between approximately 1 wt % and approximately 5 wt % $Mg(OH)_2$. Additionally, the alkaline pH in the $Mg(OH)_2$ settler 178 may allow precipitation of residual silica and anti-scalant 98 that may remain in the first desupersaturated overflow 134. Following pH adjustment of the first portion 180 of the first desupersaturated overflow 134, the first portion 180 may be directed to a settler section of the magnesium hydroxide settler 178 where the $Mg(OH)_2$ may be concentrated to generate magnesium hydroxide settler bottoms 184 having between approximately 10 wt % and approximately 30 wt % magnesium.

The magnesium hydroxide settler bottoms 184 may be fed to a second filter 186 via a fourth pump 190 to generate a magnesium hydroxide filter cake having between approximately 30 wt % and approximately 75 wt % magnesium hydroxide solids and a second filtrate 192. The second filtrate 192 may be recycled back to the magnesium hydroxide settler 178, and the magnesium hydroxide filter cake may be recovered as commercially viable magnesium hydroxide 54. In certain embodiments, the magnesium hydroxide filter cake may be mixed with the desalinated water 28 to generate a magnesium hydroxide slurry as the commercially viable product.

A second desupersaturated overflow 200 may be combined with a second portion 204 of the first desupersaturated overflow 134 and fed to the second NF system 138. In certain embodiments, the combined desupersaturated overflow 204 may be mixed with a portion of an NF permeate (e.g., from the NF systems 20, 138) to further desaturate the combined desupersaturated overflow 204 and dissolve any scaling microcrystals in the desupersaturated overflow 204 that may serve as seed crystals for the scaling components. As such, scaling of downstream membrane units and other system components may be reduced compared to systems that do not further desaturated the desupersaturated overflow. For example, the desupersaturated overflow 134, 200 may have a gypsum saturation of between approximately 105 percent and approximately 110 percent (approximately 3,000 mg/L to approximately 8,000 mg/L dissolved gypsum) and contain trace amounts of fine gypsum solids (between approximately 1 ppm and approximately 10 ppm gypsum solids). The NF permeate stream (e.g., the NF permeate 100) may be used to dilute the combined desupersaturated overflow 204 to decrease gypsum saturation to below 100 percent and dissolve any fine gypsum solids to reduce or eliminate prevent scaling in the downstream equipment. In certain embodiments, the anti-scalant 98 and HCl 72, e.g., from the HCl and NaOH production system 66, may be added to the combined desupersaturated overflow 204 upstream of the second NF system 138 to reduce scaling of the downstream system components. The HCl 70 may adjust a pH of the combined overflow 204 to between approximately 4 and approximately 7.

Similar to the first NF system 20, the second NF system 138 may include single stage or multiple stage NF unit(s). The second NF system 138 may remove any remaining scaling components in the combined desupersaturated overflow 204 and generate a second concentrated sodium chloride brine 208 (e.g., a second NF permeate stream) and an NF non-permeate stream 210. The second concentrated sodium chloride brine 208 may be combined with the first concentrated sodium chloride brine 110 generated in the first NF system 20, and the NF non-permeate stream 210 may be mixed with the brine stream 30 and fed to the gypsum reactor 116 to recover additional gypsum.

The concentrated NaCl brine 110, 208 may be fed to purification system 112, and may be used to generate various streams used throughout the water processing system 10 and/or commercially viable products that may be sold. The purification system 112 may include ion exchange system(s), reverse osmosis system(s), evaporator(s), electrodialysis (ED) system(s), electrodialysis bipolar membrane(s) (EDBM), and other suitable system components that generate the desalinated water 28 and facilitate formation of chemicals that may be used throughout the water purification system while also generating little, if any, waste streams. In certain embodiments, the HCl and NaOH production system 66 within the purification system 112 may receive the concentrated NaCl brine 110, 208 to facilitate production of HCl and/or NaOH. For example, the concentrated NaCl brine 110, 208 may be used to generate various caustic and HCl streams (e.g., the caustic solution/NaOH 70 and the HCl 72) within the HCl and NaOH production system 66. The purification system 112 may also generates chlorine (Cl) 210, bleach (NaOCl) 212, NaCl salt 214, and the desalinated water 28 from the concentrated NaCl brine 110, 208.

Figure 3:
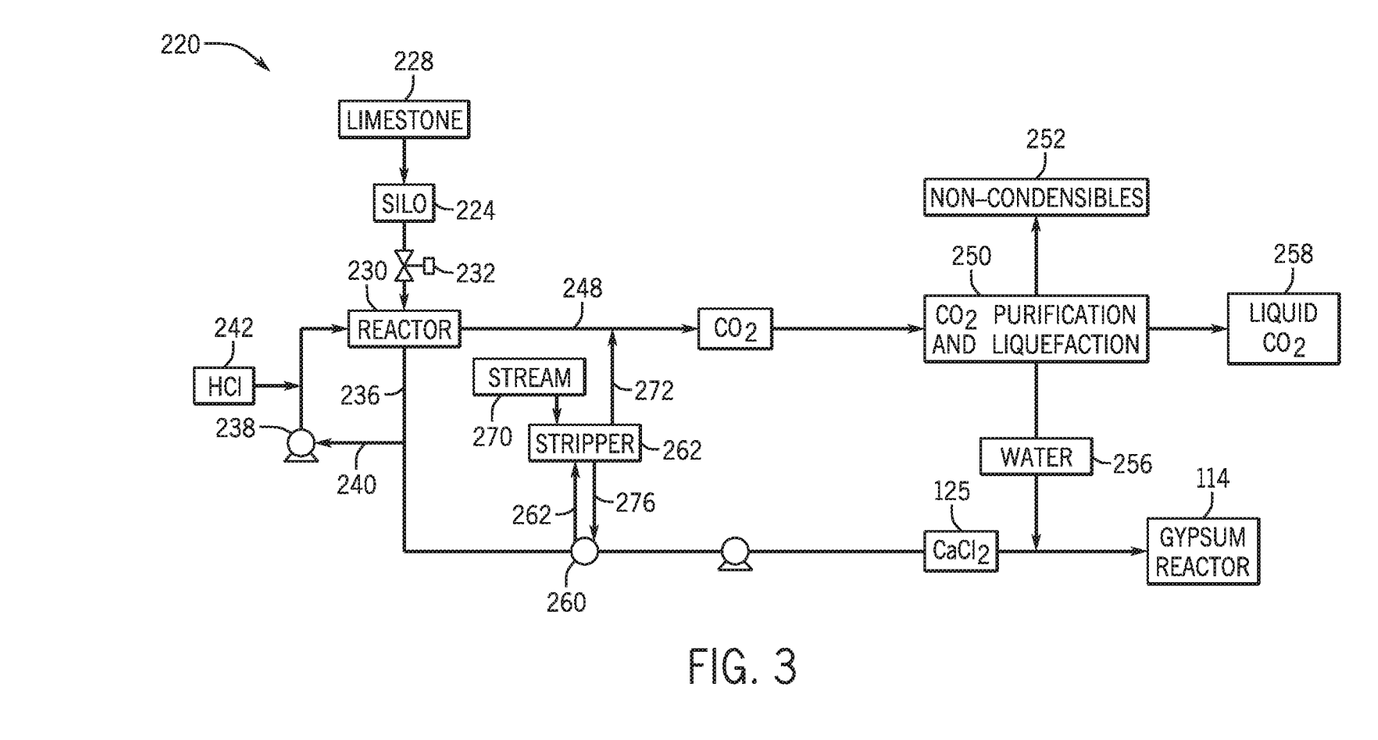
FIG. 3 is a block diagram of an embodiment of a limestone feed and carbon dioxide ($CO_2$) recovery system, in which the limestone feed and CO2 recovery system is fluidly coupled to a gypsum reactor, such as the gypsum reactor in the gypsum removal system of FIG. 2.

Certain embodiments also include a waste water treatment system, e.g. the water processing system 10, that receives calcium chloride ($CaCl_2$)) generated in the limestone feed and $CO_2$ recovery system to facilitate formation of gypsum in the gypsum reactor 114. As discussed above, in certain embodiments, the feed stream 14 may have a $Ca/SO_4$ molar ratio less than 1. As such, the brine stream 30 may have an excess of $SO_4$ that may not be recovered in the form of gypsum. Therefore, the gypsum reactor 114 may receive $CaCl_2$) that provides calcium to the brine stream 30 and increases the molar ratio of $Ca/SO_4$. Therefore, the excess $SO_4$ may react with the Ca from the $CaCl_2$) to generate gypsum, thereby desupersaturating the brine stream 30. FIG. 3 is a block diagram of an embodiment of a limestone feed and $CO_2$ recovery system 220 that may generate and supplies the $CaCl_2$) 125 to the gypsum reactor 114 within the mineral removal system 32. The limestone feed and $CO_2$ recovery system 220 includes a silo 224 that may pneumatically receive finely ground limestone 228 (e.g., calcium carbonate ($CaCO_3$). The silo 224 may feed the limestone 228 to a reactor 230 through a valve 232 (e.g., a rotary valve). The reactor 220 may be an atmospheric pressure, ambient temperature reactor. However, certain embodiments, the reactor 220 may be pressurized and/or operated at elevated temperatures. While in the reactor 230, the limestone 228 may be reacted with HCl to generate a calcium chloride brine 236. A circulation pump 238 may pump a portion 240 of reactor bottoms (e.g., the calcium chloride brine 236) back to the reactor 230. In certain embodiments, the portion 240 may be pumped through a mixing educator within the reactor 230 to provide agitation of the portion 240 and the limestone 228 within the reactor 230. HCl 242 (e.g., between approximately 1 wt % and approximately 15 wt %) may be mixed with the portion 240 of recirculated calcium chloride 236 to maintain a pH within the reactor 230 between approximately 2 and approximately 5 and facilitate formation of the calcium chloride brine 236. In addition to the calcium chloride brine 236, the reactor 230 generates $CO_2$ gas 248.

The $CO_2$ gas 240 may be directed to a $CO_2$ purification and liquefaction system 250 to remove air and other non-condensable products 252 (e.g., via ventilation) and to separate water 256 and other undesirable condensable products (e.g., via distillation) from the $CO_2$ gas 248, thereby generating liquid $CO_2$ 258. The liquid $CO_2$ 258 generated in the $CO_2$ purification and liquefaction system 250 may have greater than 90% purity. As such, purification steps generally associated with other techniques used to generate $CO_2$ may not be necessary. Due to the high purity (e.g., greater than 90%) of the liquid $CO_2$ 258, the liquid $CO_2$ may regarded as beverage grade and used to generate carbonated beverages.

The calcium chloride brine 236 generated in the reactor 230 may be fed to a heat exchanger 260 (e.g., a feed-product preheater) that preheats and directs preheated calcium chloride brine 262 to a stripper 268 that utilizes steam 270 to remove residual $CO_2$ in the preheated calcium chloride brine 262. The steam 270 may be at atmospheric pressure and may lower a partial pressure of the $CO_2$ in the preheated calcium chloride brine 262. As such, the $CO_2$ may be released from the stripper 268 as an overhead vapor phase 272. The overhead vapor phase 272 may be combined with the $CO_2$ 248 and directed to the $CO_2$ purification and liquefaction system 250. Decarbonated calcium chloride 276 from the stripper 268 may be directed to the heat exchanger 262 to preheat the preheated calcium chloride brine 262 (e.g., via indirect heat exchange), and produce calcium chloride brine 125, which may be fed to the gypsum reactor 114. In certain embodiments, the water 256 removed from the $CO_2$ 248 in the $CO_2$ purification and liquefaction system 250 may be combined with the calcium chloride brine 125 before feeding the calcium chloride brine 125 to the gypsum reactor 114.

Figure 4:
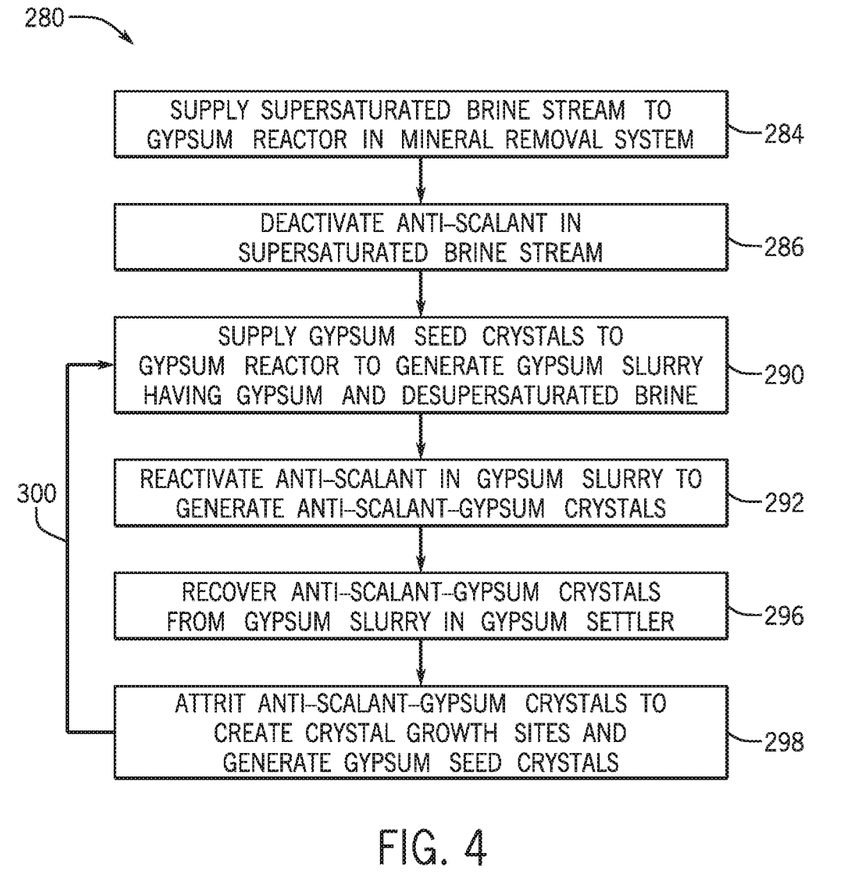
FIG. 4 is a flow diagram of an embodiment of a method for desupersaturating a supersaturated brine generated in a water processing system to generate gypsum seed crystals and desupersaturated brine, and to remove anti-scalant from the desupersaturated brine.

Certain embodiments also include a method that utilizes the gypsum removal system 115 to generate the gypsum seed crystals 124 that are free of anti-scalant and to remove the anti-scalant 98. As such, desupersaturation of the brine stream 30 may be achieved and the anti-scalant 98 may not be recycled to other processes within the water processing system 10. In this way, undesirable effects associated with incomplete desupersaturation of the brine stream 30 and recirculation of the anti-scalant 98 may be reduced or eliminated. FIG. 4 is a flow diagram of a method 280 by which a wastewater treatment system (e.g., the water processing system 10 described above) may remove hardness, divalent elements, and anti-scalant from a brine stream (e.g., the brine stream 30) to generate a desupersaturated brine. As discussed above, with reference to FIGS. 1 and 2, the first NF system receives the feed stream (e.g., brackish water, sea water, etc.) and generates the supersaturated brine stream and the first concentrated NaCl brine. The first NF system directs the supersaturated brine stream to the gypsum reactor (block 284) to generate a desupersaturated brine stream.

While the brine stream 30 is in the gypsum reactor 114, Ca and $SO_4$ ions in the supersaturated brine stream 30 react to form gypsum and generate the gypsum slurry 126 having desupersaturated brine and gypsum. However, the anti-scalant 98 in the supersaturated brine stream 30 solubilizes the Ca and $SO_4$ such that the Ca and $SO_4$ may not be removed from the supersaturated brine stream 30 in the form of gypsum. Accordingly, the method 280 includes deactivating the anti-scalant in the supersaturated brine stream (block 286). For example, the gypsum reactor 114 may operate at a pH of approximately 2 and approximately 6. The acidic pH in the gypsum reactor 114 decreases the efficiency of, and thereby deactivating, the anti-scalant 98 in the supersaturated brine stream 30. Consequently, as a result of the decreased efficiency of the anti-scalant 98, the solubility of the gypsum in the supersaturated brine stream 30 also decreases. Accordingly, the Ca and $SO_4$ in the supersaturated brine stream 30 may be removed as gypsum.

The method 280 also includes supplying gypsum seed crystals to the gypsum reactor to facilitate precipitation of the gypsum and generate the gypsum slurry having the gypsum and desupersaturated brine stream (block 290). The gypsum seed crystals provide gypsum crystal growth sites that may facilitate and accelerate precipitation of gypsum in the gypsum reactor. As discussed above, the gypsum seed crystals may be generated from gypsum recovered in the gypsum settler.

For example, at least a portion of the gypsum slurry 126 may be provided to the gypsum settler 116 to recover gypsum. While in the gypsum settler 116, the anti-scalant 98 may be removed from the desupersaturated brine. However, due, in part, to deactivation of the anti-scalant 98 in the gypsum reactor 114, the anti-scalant 98 is solubilized in the desupersaturated brine. Therefore, the method 280 includes reactivating the anti-scalant in the gypsum slurry to generate anti-scalant-absorbed gypsum in the gypsum settler (block 292). For example, the gypsum settler 116 may receive NaOH 70 from the HCl and NaOH production system 66 such that the gypsum settler 116 operates at an alkaline pH (e.g., between approximately 8 and approximately 10). The alkaline pH in the gypsum settler 116 reactivates the anti-scalant 98. The reactivated anti-scalant 98 may absorb onto the gypsum in the gypsum slurry 126, thereby removing the anti-scalant 98 from the desupersaturated brine and generating the anti-scalant-gypsum crystals.

Following activation of the anti-scalant in the gypsum settler, the method 280 further includes recovering the anti-scalant-gypsum crystals and anti-scalant from the gypsum slurry in the gypsum settler (block 296). For example, the gypsum settler 116 may include a filter that recovers the anti-scalant-absorbed gypsum from the gypsum slurry 126 and generates a gypsum filter cake and the first desupersaturated overflow 134. The first desupersaturated overflow 134 may be enriched with magnesium and substantially free of the anti-scalant 98 and gypsum. The magnesium in the first desupersaturated overflow 134 may be recovered as commercially viable magnesium hydroxide ($Mg(OH)_2$) in the $Mg(OH)_2$ settler 178, as discussed above with reference to FIG. 2.

The gypsum recovered in the gypsum settler 116 may be used to generate the gypsum seed crystals 124 fed to the gypsum reactor 114. However, as discussed above, the gypsum recovered in the gypsum settler 116 has absorbed anti-scalant 98. As such, the recovered gypsum crystals from the gypsum settler 116 have absorbed anti-scalant 98 and unsuitable to promote gypsum crystal growth in the gypsum reactor 114. Accordingly, the method 280 further includes removing the anti-scalant from the anti-scalant absorbed gypsum to generate the gypsum seed crystals (block 298). For example, the gypsum recovered in the gypsum settler 116 may be fed to the second pump 142, which attrits and reduces the particle size of the gypsum recovered from the gypsum settler 116. Attrition of the gypsum breaks the gypsum to reduce the particle size of the gypsum and remove the absorbed anti-scalant 98 from the outer surfaces of the gypsum, thereby generating the gypsum seed crystals 124. The gypsum seed crystals 124 may be fed to the gypsum reactor 114 to promote gypsum crystal growth and desupersaturation of the supersaturated brine stream 30, as shown by arrow 300. In this way, the mineral removal system 32 may remove the anti-scalant 98 and scale forming compounds (e.g., calcium, magnesium, etc.) from the water processing system 10. Additionally, generating the gypsum seed crystals 124 from the gypsum recovered in the gypsum settler may decrease operational costs of the water processing system 10 associated with using supplemental mineral feeds. Moreover, the mineral removal system 32 utilizes desupersaturated overflow streams, NF non-permeate streams, and other product streams to generate chemicals that may be used throughout the water processing system 10. As such, the water processing system 10 may not produce waste sludge and/or waste brines.

As described above, certain embodiments of the water processing system 10 remove anti-scalant and scaling components from a supersaturated brine stream. The scaling components may be recovered to generate commercially viable products such as gypsum and magnesium hydroxide. Additionally, a portion of the recovered gypsum may be used as seed crystals to promote gypsum crystal growth in a gypsum removal system to achieve complete desupersaturation of a supersaturated brine stream. Accordingly, undesirable effects associated with recycling anti-scalant throughout the water processing system 10 and scaling resulting from incomplete desupersaturation of the supersaturated brine stream may be reduced. Consequently, the overall operational and maintenance costs associated with the water processing system 10 may be decreased compared to water processing system(s) that recycle the anti-scalant and/or desupersaturate the supersaturated brine stream using techniques that generate waste sludge and waste brines.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
a gypsum reactor configured to receive a supersaturated brine stream comprising a plurality of minerals and an anti-scalant, wherein the plurality of minerals comprises gypsum, the gypsum reactor is configured to deactivate the anti-scalant such that gypsum precipitates from the supersaturated brine and the gypsum reactor is configured to generate a gypsum slurry having a mixture of a desupersaturated brine, precipitated gypsum, and the anti-scalant in solution with the desupersaturated brine; and
a gypsum settler disposed downstream from and fluidly coupled to the gypsum reactor, wherein the gypsum settler is configured to receive a first portion of the gypsum slurry from the gypsum reactor, to reactivate the anti-scalant such that the anti-scalant absorbs onto the precipitated gypsum to remove the anti-scalant from the desupersaturated brine, and to generate anti-scalant-gypsum crystals and a desupersaturated overflow comprising at least a portion of the plurality of minerals.

2. The system of claim 1, comprising a hydrochloric acid (HCl) and sodium hydroxide (NaOH) production system fluidly coupled to the gypsum reactor and to the gypsum settler, wherein the HCl and NaOH production system is configured to supply the gypsum reactor with HCl via a first flow path to deactivate the anti-scalant.

3. The system of claim 2, wherein the HCl and NaOH production system is configured to supply the gypsum settler with NaOH via a second flow path to reactivate the anti-scalant.

4. The system of claim 1, wherein the gypsum settler comprises a filter configured to recover the anti-scalant-gypsum crystals to generate a gypsum filter cake and the desupersaturated overflow.

5. The system of claim 1, comprising an attrition device disposed downstream from and fluidly coupled to the gypsum settler, and disposed upstream of and fluidly coupled to the gypsum reactor, wherein the attrition device is configured to receive the anti-scalant-gypsum crystals from the gypsum settler and to generate gypsum seed crystals from the anti-scalant-gyp sum crystals.

6. The system of claim 5, wherein the attrition device comprises a pump configured to attrit the anti-scalant-gypsum crystals, to remove the anti-scalant absorbed onto the anti-scalant-gypsum crystals, and to generate the gypsum seed crystals.

7. A system, comprising:
a mineral removal system comprising a gypsum removal system fluidly coupled to a water treatment system and configured to receive a supersaturated brine stream comprising a plurality of minerals and an anti-scalant from the water treatment system, wherein the plurality of minerals comprises gypsum, and wherein the gypsum removal system comprises:
a gypsum reactor configured to receive the supersaturated brine stream, to deactivate the anti-scalant such that gypsum precipitates from the supersaturated brine, and to generate a gypsum slurry having a mixture of a desupersaturated brine, precipitated gypsum, and the anti-scalant in solution with the desupersaturated brine; and
a gypsum settler disposed downstream from and fluidly coupled to the gypsum reactor, wherein the gypsum settler is configured to receive a first portion of the gypsum slurry from the gypsum reactor, to reactivate the anti-scalant such that the anti-scalant absorbs onto the precipitated gypsum to remove the anti-scalant from the desupersaturated brine, and to generate anti-scalant-gypsum crystals and a desupersaturated overflow comprising at least a portion of the plurality of minerals; and an attrition device disposed downstream from and fluidly coupled to the gypsum settler, wherein the attrition device is configured to receive the anti-scalant-gypsum crystals from the gypsum settler and to generate gypsum seed crystals from the anti-scalant-gypsum crystals.

8. The system of claim 7, comprising a gypsum recovery system fluidly coupled to the gypsum reactor and the gypsum settler, wherein the gypsum recovery system is configured to receive a second portion of the gypsum slurry from the gypsum reactor and to generate a gypsum product and a gypsum recycle stream.

9. The system of claim 7, comprising a nanofiltration (NF) system disposed downstream from and fluidly coupled to the gypsum settler, wherein the NF system is configured to receive the desupersaturated overflow from the gypsum settler, to generate a concentrated brine stream comprising at least the portion of the plurality of minerals, and to generate a dilute brine stream comprising sodium chloride (NaCl).

10. The system of claim 9, comprising a hydrochloric acid (HCl) and sodium hydroxide (NaOH) production system fluidly coupled to the NF system, to the gypsum reactor, and to the gypsum settler, wherein the HCl and NaOH production system is configured to receive the dilute brine stream, to generate HCl and NaOH from the NaCl in the dilute brine stream, to supply the gypsum reactor with the HCl via a first flow path to deactivate the anti-scalant.

11. The system of claim 10, wherein the HCl and NaOH production system is configured to supply the gypsum settler with NaOH via a second flow path to reactivate the anti-scalant.

12. The system of claim 7, wherein the gypsum reactor is configured to receive a flow of sulfuric acid ($H_2SO_4$) to generate the precipitated gypsum.

13. The system of claim 7, wherein the attrition device comprises a pump configured to attrit the anti-scalant-gypsum crystals, to remove the anti-scalant absorbed onto the anti-scalant-gypsum crystals, and to generate the gypsum seed crystals.

* * * * *